United States Patent
Kautzky et al.

(10) Patent No.: US 6,344,953 B1
(45) Date of Patent: Feb. 5, 2002

(54) MAGNETORESISTIVE READ SENSOR USING OVERLAID LEADS WITH INSULATING CURRENT GUIDE LAYER

(75) Inventors: Michael C. Kautzky, Eagan; Dimitar V. Dimitrov, Edina, both of MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/521,402

(22) Filed: Mar. 8, 2000

(51) Int. Cl.$^7$ ................................................. G11B 5/39
(52) U.S. Cl. ........................................ 360/322; 360/320
(58) Field of Search ................................. 360/322, 320

(56) References Cited

U.S. PATENT DOCUMENTS

| | | |
|---|---|---|
| 4,782,414 A | 11/1988 | Krounbi et al. |
| 5,018,037 A | 5/1991 | Krounbi et al. |
| 5,438,470 A | 8/1995 | Ravipati et al. |
| 5,654,566 A | 8/1997 | Johnson |
| 5,680,281 A | 10/1997 | Kung et al. |
| 5,928,715 A | 7/1999 | Ravipati et al. |
| 5,946,167 A | 8/1999 | Hara et al. |
| 5,949,623 A | 9/1999 | Lin |
| 6,040,962 A | 3/2000 | Kanazawa et al. |
| 6,219,207 B1 * | 4/2001 | Pinarbasi .................... 360/322 |

FOREIGN PATENT DOCUMENTS

JP            09-212826        *    8/1997

* cited by examiner

Primary Examiner—Craig A. Renner
(74) Attorney, Agent, or Firm—Kinney & Lange

(57) ABSTRACT

A magnetoresistive read sensor has a magnetoresistive element, first and second bias elements, first and second current guides, and first and second overlaid leads. The magnetoresistive element has a center region and end regions separated by the center region. The first and second bias elements are positioned on the end regions of the magnetoresistive element. The first and second current guides are positioned on respective first and second bias elements. Each of the first and second current guides extends a guide overlay distance onto the center region of magnetoresistive element. The first and second overlaid leads are positioned on respective first and second current guides. Each of the first and second overlaid leads extends a lead-insulator offset distance onto the center region of the magnetoresistive element. The first and second overlaid leads are separated by a lead separation distance.

27 Claims, 3 Drawing Sheets

MAGNETORESISTIVE READ SENSOR USING OVERLAID LEADS WITH INSULATING CURRENT GUIDE LAYER

CROSS-REFERENCE TO RELATED APPLICATION(S)

None.

BACKGROUND OF THE INVENTION

The present invention relates generally to the field of magnetic data storage and retrieval systems. More particularly, the present invention relates to a magnetoresistive read sensor having a magnetoresistive element, a pair of overlaid leads and a current guiding layer for directing substantially all of bias current through a narrow region close to an active central area of the magnetoresistive element.

A transducing head of a magnetic data storage and retrieval system typically includes a magnetoresistive (MR) reader portion for retrieving magnetic data stored on a magnetic media. The reader is typically formed of several layers which include a MR sensor positioned between two gap layers, which are in turn positioned between two shield layers. The MR sensor may be any one of a plurality of MR-type sensors, including, but not limited to, AMR, GMR, spin valve and spin tunneling sensors.

To operate the MR sensor properly, the sensor must be stabilized against the formation of edge domains because domain wall motion results in electrical noise that makes data recovery impossible. A common way to achieve stabilization is with a permanent magnet abutted junction design. Permanent magnets have a high coercive field (i.e., are hard magnets). The magnetostatic field from the permanent magnets stabilizes the MR sensor and prevents edge domain formation, and provides proper bias.

Tabs of antiferromagnetic material, sometimes called "exchange tabs," have also been used to stabilize the MR sensor. Exchange tabs are deposited upon the outer regions of the MR sensor and are exchange coupled thereto. Functions of the exchange tabs include pinning the magnetization of the outer regions of the MR sensor in the proper direction, preventing the formation of edge domains and defining the width of an active area of the MR sensor by preventing rotation of the magnetization at of the outer regions of MR sensor.

When the transducing head is placed near a magnetic medium, a resistance of the MR sensor fluctuates in response to a magnetic field emanating from written transitions in the magnetic medium. By providing a sense current through the MR sensor, the resistance of the sensor can be measured and used by external circuitry to decipher the information stored on the magnetic medium. The sense current is provided to the MR sensor via a pair of current contacts.

In prior art transducing heads, the current contacts were deposited on the biasing elements (either the abutted junction permanent magnets or the exchange tabs), such that the sense current passes through the MR sensor via the biasing elements. This arrangement of current contacts and biasing elements in prior art transducing heads allows for the sense current and the magnetic bias to share a common path through the biasing elements. It was previously believed that a shared magnetic and electrical path would occupy less physical space to allow for a smaller transducing head to be built. However, to be electrically reliable, the interface between the biasing elements and the MR sensor needs to be large in surface area to minimize the electrical resistance and to minimize the possibility of open contacts caused by the manufacturing process.

More recently, the use of overlaid current contacts have been used. As with the traditional current contact configurations, the pair of overlaid current contacts are deposited upon the biasing elements. However, the overlaid current contacts differ from the traditional current contacts in that the overlaid current contacts are also deposited directly on portions of the MR sensor. To ensure that most of the sense current flows directly into the MR sensor, rather than passing first through the biasing elements, the relative conductivities of the overlaid current contacts, the MR sensor, and the biasing elements can be controlled. Nonetheless, some of the sense current will still pass through the biasing elements before entering the MR sensor, contributing to side-reading in intermediate areas of the MR sensor in which the bias field exerted by the biasing elements has dropped off.

Accordingly, there is a need for a means of forcing the sense current through the active regions of the MR sensor.

BRIEF SUMMARY OF THE INVENTION

The present invention is a magnetoresistive sensor having overlaid leads and an insulating current guide layer for preventing diversion of current through the biasing means.

A magnetoresistive read sensor has a magnetoresistive element, first and second bias elements, first and second current guides, and first and second overlaid leads. The magnetoresistive element has a center region and end regions separated by the center region. The first and second bias elements are positioned on the end regions of the magnetoresistive element. The first and second current guides are positioned on respective first and second bias elements. Each of the first and second current guides extends a guide overlay distance onto the center region of magnetoresistive element. The first and second overlaid leads are positioned on respective first and second current guides. Each of the first and second overlaid leads extends a lead-insulator offset distance onto the center region of the magnetoresistive element. The first and second overlaid leads are separated by a lead separation distance.

DETAILED DESCRIPTION

Figure 1:
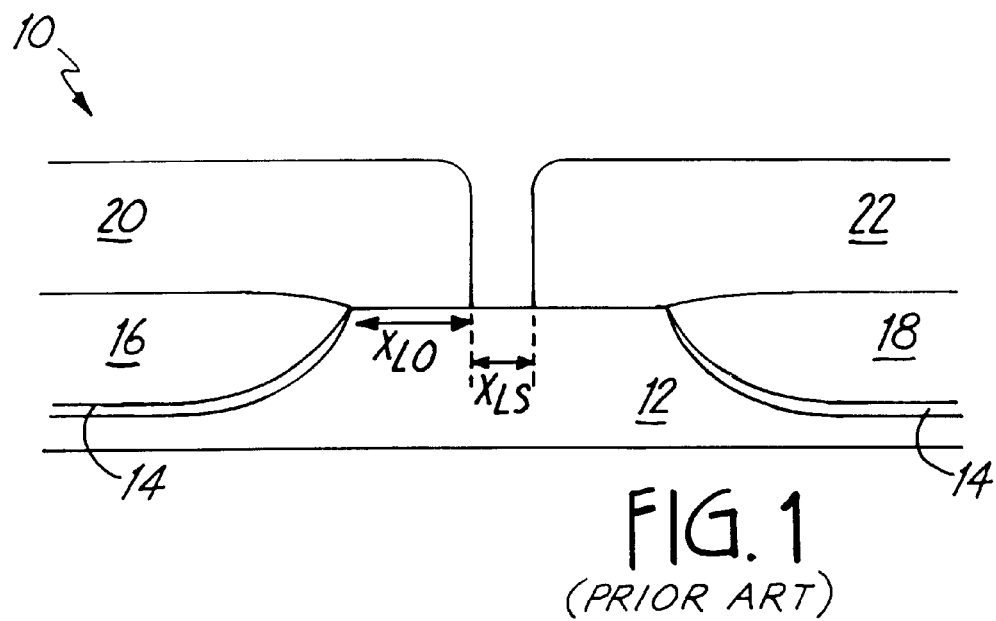
FIG. 1 is a cross-sectional view of a prior art transducing head having an overlaid current contacts and permanent magnet abutted junction biasing.

FIG. 1 is a cross-sectional view of prior art transducing head 10 taken along a plane parallel to an air bearing surface (ABS) of transducing head 10. Transducing head 10 includes MR sensor 12, permanent magnet seed layer 14, first and second permanent magnets 16 and 18, and first and second overlaid current contacts 20 and 22.

MR sensor 12 may be any one of a plurality of MR-type sensors, including, but not limited to, AMR, GMR, spin valve and spin tunneling sensors. MR sensor 12 has two end regions separated by a central region.

First and second permanent magnets 16 and 18, which are grown on seed layer 14, are positioned on the end regions of MR sensor 12 to provide longitudinal magnetic bias to MR sensor 12. First and second permanent magnets 16 and 18 form abutted junctions with MR sensor 12. Seed layer 14 separates first and second permanent magnets 16 and 18 from MR sensor 12 and provides proper crystallographic orientation of permanent magnets 16 and 18.

First and second overlaid current contacts 20 and 22 are deposited over respective first and second permanent magnets 16 and 18. Additionally, each of first and second overlaid current contacts 20 and 22 overlays MR sensor 12 by lead overlay distance $X_{LO}$. First and second overlaid current contacts 20 and 22 are separated from each other by lead separation distance $X_{LS}$.

When transducing head 10 is placed near a magnetic medium (not shown in FIG. 1), a resistance of MR sensor 12 fluctuates in response to a magnetic field emanating from written transitions in the magnetic medium. During a read operation, first and second overlaid current contacts 20 and 22 provide a sense current to MR sensor 12. By measuring the voltage across MR sensor 12, the information stored on the magnetic medium can be deciphered through use of external circuitry.

Figure 2:
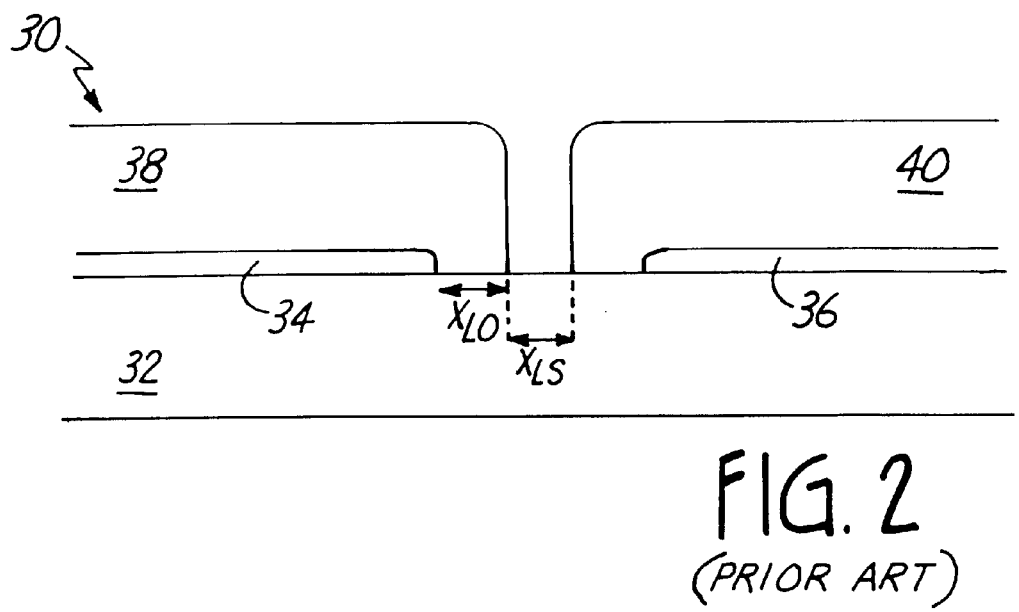
FIG. 2 is a cross-sectional view of a prior art transducing head having overlaid current contacts and exchange tab biasing.

FIG. 2 is a cross-sectional view of prior art transducing head 30 taken along a plane parallel to an air bearing surface (ABS) of transducing head 30. Transducing head 30 includes MR sensor 32, first and second exchange tabs 34 and 36, and first and second overlaid current contacts 38 and 40.

MR sensor 32 may be any one of a plurality of MR-type sensors, including, but not limited to, AMR, GMR, spin valve and spin tunneling sensors. MR sensor 32 has two end regions separated by a central region.

First and second exchange tabs 34 and 36, which are formed of an antiferromagnetic material, are exchange coupled to the end regions of MR sensor 32 to provide longitudinal magnetic bias to MR sensor 32. First and second exchange tabs 34 and 36 pin the magnetization of the outer regions of MR sensor 32 in a desired direction to prevent the formation of edge domains and to define the width of an active region of MR sensor 32 by preventing rotation of the magnetization at the outer regions of MR sensor 32.

First and second overlaid current contacts 38 and 40 are deposited over respective first and second exchange tabs 34 and 36. Additionally, each of first and second overlaid current contacts 38 and 40 overlays MR sensor 32 by lead overlay distance $X_{LO}$. First and second overlaid current contacts 38 and 40 are separated from each other by lead separation distance $X_{LS}$.

When transducing head 30 is placed near a magnetic medium (not shown in FIG. 2), a resistance of MR sensor 32 fluctuates in response to a magnetic field emanating from written transitions in the magnetic medium. During a read operation, first and second overlaid current contacts 38 and 40 provide a sense current to MR sensor 32. By measuring the voltage across MR sensor 32, the information stored on the magnetic medium can be deciphered through use of external circuitry.

In prior art transducing head 10 having overlaid current contacts 20 and 22, most of the sense current flowing between contacts 20 and 22 will flow directly into MR sensor 12; however, there will be some leakage of sense current into MR sensor 12 through permanent magnets 16 and 18. Similarly in prior art transducing head 30 having overlaid current contacts 38 and 40, there will be some leakage of sense current through exchange tabs 34 and 36. This leakage of sense current into MR sensor 12 through the biasing elements (either permanent magnets 16 and 18 or exchange tabs 34 and 36) results in side-reading and a wider read width of the MR sensor than if there were no leakage of sense current through the biasing elements. Accordingly, there is a need to minimize the amount of sense current leaked through the biasing elements.

Figure 3:
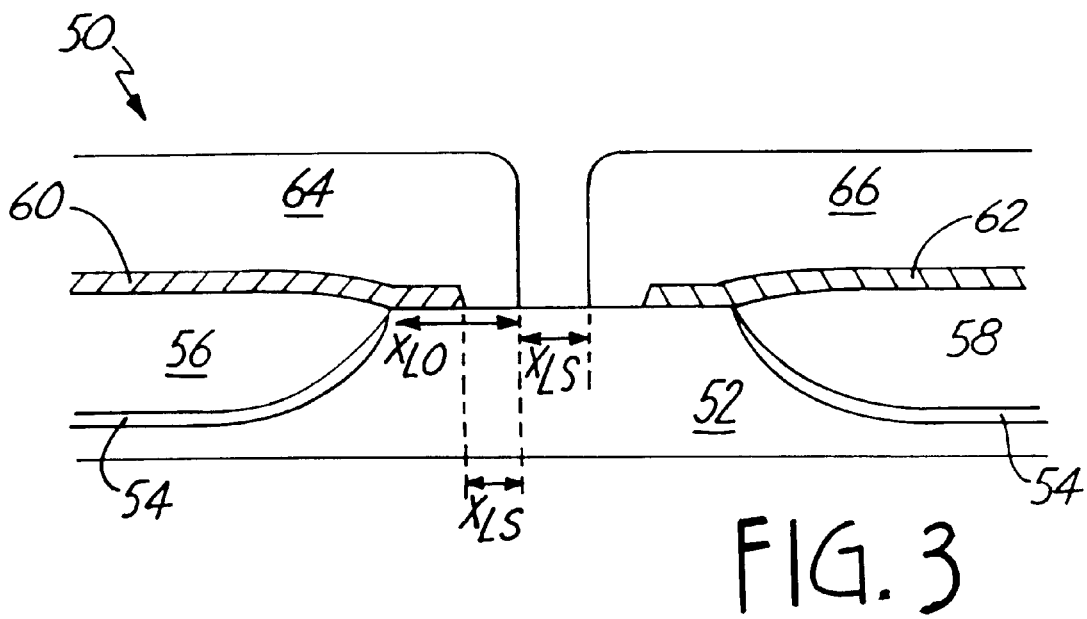
FIG. 3 is a cross-sectional view of a transducing head in accord with the present invention and having overlaid current contacts and permanent magnet abutted junction biasing.

FIG. 3 is a cross-sectional view of transducing head 50 in accord with the present invention, the cross-section being taken along a plane parallel to an air bearing surface (ABS) of transducing head 50. Transducing head 50 includes MR sensor 52, seed layer 54, first and second permanent magnets 56 and 58, first and second current guides 60 and 62, and first and second overlaid current contacts 64 and 66.

MR sensor 52 may be any one of a plurality of MR-type sensors, including, but not limited to, AMR, GMR, spin valve and spin tunneling sensors. MR sensor 52 has two end regions separated by a central region.

First and second permanent magnets 56 and 58, which are grown on seed layer 54, are positioned on the end regions of MR sensor 52 to provide longitudinal magnetic bias to MR sensor 52. First and second permanent magnets 56 and 58 form abutted junctions with MR sensor 52. Seed layer 54 separates first and second permanent magnets 56 and 58 from MR sensor 52 and provides proper crystallographic orientation of permanent magnets 56 and 58.

First and second current guides 60 and 62 are deposited upon respective first and second permanent magnets 56 and 58. Additionally, each of first and second current guides 60 and 62 overlays a small portion of MR sensor 52. Preferably, first and second current guides 60 and 62 are each formed of an insulating material, such as an oxide or a nitride. Most preferably, first and second current guides 60 and 62 are formed of aluminum-oxide. Also in a preferred embodiment, a thickness of first and second current guides 60 and 62 is in the range of about 50 Å to about 100 Å.

First and second overlaid current contacts 64 and 66 are deposited over respective first and second current guides 60 and 62. Additionally, each of first and second overlaid current contacts 64 and 66 overlays a small portion of MR sensor 52. Lead-overlay distance $X_{LO}$, lead-insulator offset $X_{LI}$, and lead-separation distance $X_{LS}$ are three parameters used to define the interrelations of MR sensor 52, current guides 60 and 62, and current contacts 64 and 66. Lead-overlay distance $X_{LO}$ is the distance that either of first or second current contact 64 or 66 would overlay MR sensor 52 if respective current guide 60 or 62 were not present. Lead-insulator offset $X_{LI}$ is the distance that either of first or second current contact 64 or 66 actually overlays (or directly contacts) MR sensor 52. Finally, lead separation distance $X_{LS}$ is the distance between first and second overlaid current contacts 64 and 66.

In a preferred embodiment, lead-overlay distance $X_{LO}$ is greater than about 0.1 micrometers, lead-insulator offset $X_{LI}$ is in the range of about 0.05 micrometers to about 0.2 micrometers, and lead separation distance $X_{LS}$ is less than about 0.3 micrometers. Lead-insulator offset $X_{LI}$ is more preferably in the range of about 0.09 micrometers to about 0.11 micrometers.

When transducing head 50 is placed near a magnetic medium (not shown in FIG. 3), a resistance of MR sensor 52 fluctuates in response to a magnetic field emanating from written transitions in the magnetic medium. During a read operation, first and second overlaid current contacts 64 and 66 provide a sense current to MR sensor 52. By measuring the voltage across MR sensor 52, the information stored on the magnetic medium can be deciphered through use of external circuitry. First and second current guides 60 and 62 minimize the amount of sense current leaked into MR sensor 52 through either of first and second permanent magnets 56 and 58.

Figure 4:
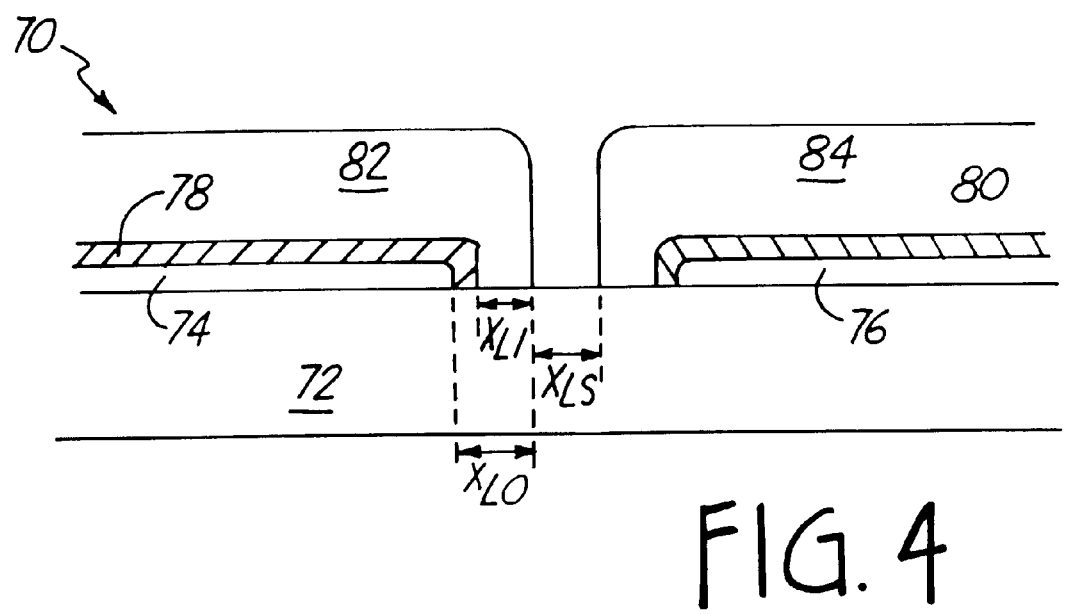
FIG. 4 is a cross-sectional view of a transducing head in accord with the present invention and having overlaid current contacts and exchange tab biasing.

FIG. 4 is a cross-sectional view of transducing head 70 in accord with the present invention, the cross-section being taken along a plane parallel to an air bearing surface (ABS) of transducing head 70. Transducing head 70 includes MR sensor 72, first and second exchange tabs 74 and 76, first and second current guides 78 and 80, and first and second overlaid current contacts 82 and 84.

MR sensor 72 may be any one of a plurality of MR-type sensors, including, but not limited to, AMR, GMR, spin valve and spin tunneling sensors. MR sensor 72 has two end regions separated by a central region.

First and second exchange tabs 74 and 76, which are formed of an antiferromagnetic material, are exchange coupled to the end regions of MR sensor 72 to provide longitudinal magnetic bias to MR sensor 72. First and second exchange tabs 74 and 76 pin the magnetization of the outer regions of MR sensor 72 in a desired direction to prevent the formation of edge domains and to define the width of an active region of MR sensor 72 by preventing rotation of the magnetization at the outer regions of MR sensor 72.

First and second current guides 78 and 80 are deposited upon respective first and second exchange tabs 74 and 76. Additionally, each of first and second current guides 78 and 80 overlays a small portion of MR sensor 72. Preferably, first and second current guides 78 and 80 are each formed of an insulating material, such as an oxide or a nitride. Most preferably, first and second current guides 78 and 80 are formed of aluminum-oxide. Also in a preferred embodiment, a thickness of first and second current guides 78 and 80 is in the range of about 50 Å to about 100 Å.

First and second overlaid current contacts 82 and 84 are deposited over respective first and second current guides 78 and 80. Additionally, each of first and second overlaid current contacts 82 and 84 overlays a small portion of MR sensor 72. Lead-overlay distance $X_{LO}$, lead-insulator offset $X_{LI}$, and lead-separation distance $X_{LS}$ are three parameters used to define the interrelations of MR sensor 72, current guides 78 and 80, and current contacts 82 and 84. Lead-overlay distance $X_{LO}$ is the distance that either of first or second current contact 82 or 84 would overlay MR sensor 72 if respective current guide 78 or 80 were not present. Lead-insulator offset $X_{LI}$ is the distance that either of first or second current contact 82 or 84 actually overlays (or directly contacts) MR sensor 72. Finally, lead separation distance $X_{LS}$ is the distance between first and second overlaid current contacts 82 and 84.

In a preferred embodiment, lead-overlay distance $X_{LO}$ is greater than about 0.1 micrometers, lead-insulator offset $X_{LI}$ is in the range of about 0.05 micrometers to about 0.2 micrometers, and lead separation distance $X_{LS}$ is less than about 0.3 micrometers. Lead-insulator offset $X_{LI}$ is more preferably in the range of about 0.09 micrometers to about 0.11 micrometers.

When transducing head 70 is placed near a magnetic medium (not shown in FIG. 4), a resistance of MR sensor 72 fluctuates in response to a magnetic, field emanating from written transitions in the magnetic medium. During a read operation, first and second overlaid current contacts 82 and 84 provide a sense current to MR sensor 72. By measuring the voltage across MR sensor 72, the information stored on the magnetic medium can be deciphered through use of external circuitry. First and second current guides 78 and 80 minimize the amount of sense current leaked into MR sensor 72 through either of first or second exchange tabs 74 or 76.

To illustrate, the effectiveness of current guides 60 and 62 in transducing head 50 of the present invention, a transducing head (having abutted-junction permanent magnet biasing) was modeled with a 600 Å PtMn-pinned dual spin valve sensor, a 50 Å Cr seed layer, 400 Å CoCrPt permanent magnets, 50 Å $Al_2O_3$ current guides, 100 Å Cr/1000 Å Ta overlaid current contacts, a lead-separation distance $X_{LS}$ of 0.2 $\mu$m, and a variable lead-insulator offset $X_{LI}$ in the range of 0.5 $\mu$m to 0.2 $\mu$m. With lead insulator offset $X_{LI}$ equal to 0.2 $\mu$m in this embodiment, the current guides do not overlay the MR sensor.

Figure 5:
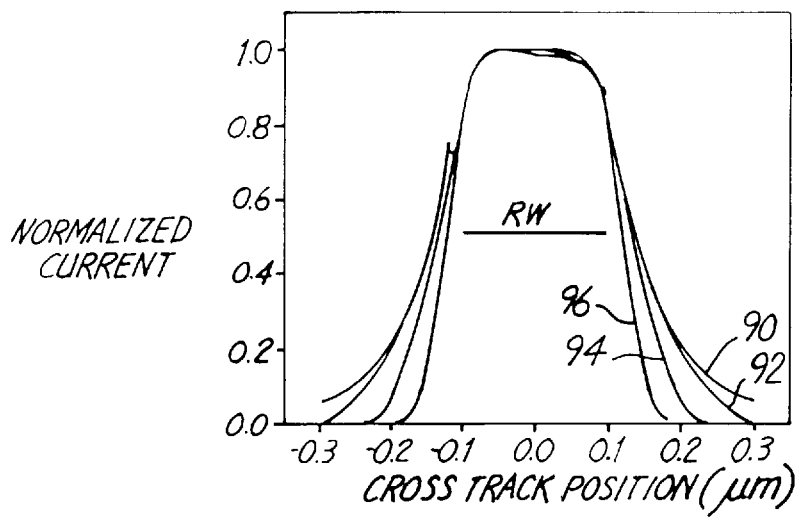
FIG. 5 is a graph of current distribution curves produced by transducing heads with varying lead-insulator offsets.

FIG. 5 is a graph of current distribution curves produced by transducing heads with varying lead insulator offsets. Current distribution curve 90 was produced by a nominal transducing head having no current guides, current distribution curve 92 was produced by a transducing head having a lead-insulator offset $X_{LI}$ of 0.18 $\mu$m, current distribution curve 94 was produced by a transducing head having a lead-insulator offset $X_{LI}$ of 0.1 $\mu$m, and current distribution curve 96 was produced by a transducing head having a lead insulator offset $X_{LI}$ of 0.05 $\mu$m. As shown in FIG. 5, a smaller lead insulator offset $X_{LI}$ results in a tighter current distribution curve. The tighter the current distribution curve, the less side-reading occurs and the narrower the read width.

Figure 6:
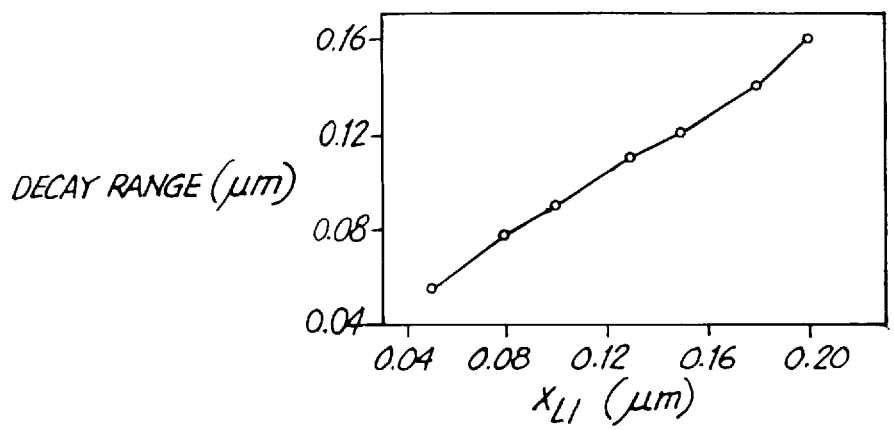
FIG. 6 is a graph illustrating decay range of a transducing head's current distribution curve versus the lead-insulator offset of the transducing heads.

FIG. 6 is a graph illustrating decay range of a transducing head's current distribution curve versus the lead-insulator offset $X_{LI}$ of the transducing heads. Decay range for a particular distribution curve is defined as the difference between a nominal reader width of 0.2 $\mu$m and the cross-track position of the 10% value of the current distribution curve. As shown in FIG. 6, the decay range equals 0.16 $\mu$m when the lead-insulator offset $X_{LI}$ equals 0.2 $\mu$m, and equals 0.055 $\mu$m when the lead-insulator offset $X_{LI}$ equals 0.05 $\mu$m. Accordingly, the decay range is directly related to the lead-insulator offset $X_{LI}$.

Figure 7:
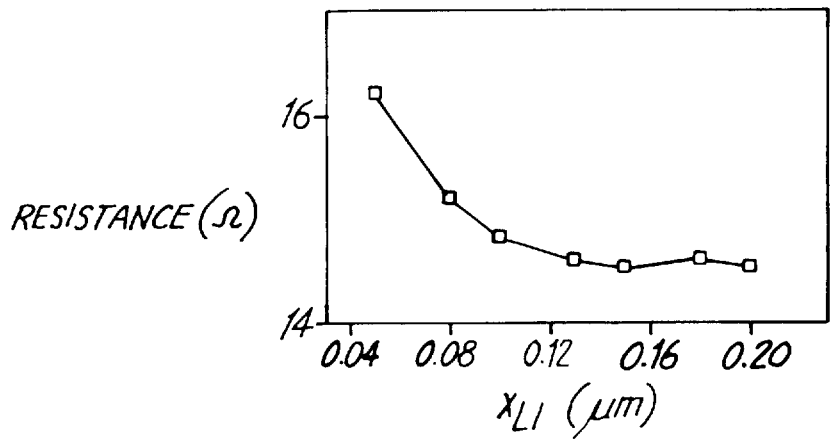
FIG. 7 is a graph illustrating contact resistance of a MR sensor of a transducing head versus the lead-insulator offset of the transducing heads.

FIG. 7 is a graph illustrating contact resistance of a MR sensor of a transducing head versus the lead-insulator offset $X_{LI}$ of the transducing heads. The contact resistance of a MR sensor is affected by the surface area of the junction between the current contacts and the MR sensor. If the surface area of that junction becomes too small, the contact resistance of the MR sensor rapidly increases, negatively affecting the performance of the MR sensor. As FIG. 7 illustrates, for values of the lead-insulator offset $X_{LI}$ less than 0.1 $\mu$m, the contact resistance of the MR sensor rapidly increases; whereas, for values of the lead-insulator offset $X_{LI}$ greater than 0.1 $\mu$m, there is relatively little change in the contact resistance of the MR sensor. A significant increase in resistance of the MR sensor may not only result in increased head amplitude values, it may contribute to thermal reliability problems with the sensor.

As illustrated in FIGS. 5–7, there is a trade-off in selecting a value of lead-insulator offset $X_{LI}$. As $X_{LI}$ decreases, the current distribution curve becomes more desirable, but the contact resistance of the MR sensor undesirably increases. Conversely, as the lead-insulator offset $X_{LI}$ increases, the current distribution becomes less desirable, but the contact resistance of the MR sensor remains more stable.

In conclusion, the present invention is a novel current guide layer positioned between the biasing elements and the overlaid current contacts of a transducing head. The use of this novel current guide layers minimizes the amount of sense current leaked into the MR sensor via the biasing elements, resulting in a tighter current distribution curve and a narrower reader width.

Although the present invention has been described with reference to preferred embodiments, workers skilled in the art will recognize that changes may be made in form and detail without departing from the spirit and scope of the invention.

What is claimed is:

1. A transducing head comprising:
   a magnetoresistive read sensor Comprising a magnetoresistive element having a first and a second end region separated by a center region, a first bias element positioned adjacent the first end region of the magnetoresistive element, a second bias element positioned adjacent the second end region of the magnetoresistive element, a first overlaid lead positioned adjacent the first end region of the magnetoresistive element, and a second overlaid lead positioned adjacent the second end region of the magnetoresistive element, wherein the first overlaid lead extends toward the center region of the magnetoresistive element a lead-overlay distance past the first bias element, and the second overlaid lead extends toward the center region of the magnetoresistive element a lead-overlay distance past the second bias element; and
   current guiding means for electrically insulating the first bias element from the first overlaid lead and for electrically insulating the second bias element from the second overlaid lead.

2. The transducing head of claim 1 wherein the current guiding means is a first current guide layer positioned on the first bias element and a second current guide layer positioned on the second bias element, wherein each of the first and second current guide layers extends a guide-overlay distance onto the center region of the magnetoresistive element, wherein the guide-overlay distance is less than at least one of the lead-overlay distances.

3. The transducing head of claim 2 wherein the first and second current guide layers are each formed of an insulating material.

4. The transducing head of claim 2 wherein the first and second current guide layers are each formed of a material selected from the group consisting of oxides and nitrides.

5. The transducing head of claim 2 wherein the first and second current guide layers are each formed of aluminum-oxide.

6. The transducing head of claim 2 wherein the first and second current guide layers each have a thickness in the range of about 50 Å to about 100 Å.

7. The transducing head of claim 1 wherein the first and second bias elements are each permanent magnets formed of a hard magnetic material, the first bias element being arranged to form an abutted junction with the first end region of the magnetoresistive element and the second bias element being arranged to form an abutted junction with the second end region of the magnetoresistive element.

8. The transducing head of claim 1 wherein the first and second bias elements are each exchange tabs formed of an antiferromagnetic material, the first bias element being exchange coupled to the first end region of the magnetoresistive element and the second bias element being exchange coupled to the second end region of the magnetoresistive element.

9. The magnetoresistive read sensor of claim 1 wherein a lead-insulator offset distance is in the range of about 0.05 microns to about 0.2 microns.

10. A magnetoresistive read sensor comprising:
    a magnetoresistive element having a first and a second end region separated by a center region;
    a first bias element positioned on the first end region of the magnetoresistive element;
    a second bias element positioned on the second end region of the magnetoresistive element;
    a first current guide positioned on the first bias element, and extending a guide-overlay distance onto the center region of the magnetoresistive element wherein the first current guide is formed of an insulating material;
    a second current guide positioned on the second bias element, and extending a guide-overlay distance onto the center region of the magnetoresistive element wherein the second current guide is formed of an insulating material; and
    a first overlaid lead positioned on the first current guide and a second overlaid lead positioned on the second current guide, wherein each of the first and second overlaid leads extends a lead-insulator offset distance onto the center region of the magnetoresistive element, and wherein the first and second overlaid leads are separated by a lead-separation distance.

11. The magnetoresistive read sensor of claims 10 wherein the lead-separation distance is less than about 0.3 microns.

12. The magnetoresistive read sensor of claim 10 wherein the insulating material is selected from the group consisting of oxides and nitrides.

13. The magnetoresistive read sensor of claim 10 wherein the insulating material is aluminum-oxide.

14. The magnetoresistive read sensor of claim 10 wherein the first and second current guides each have a thickness in the range of about 50 Å to about 100 Å.

15. The magnetoresistive read sensor of claim 10 wherein the first and second bias elements are each permanent magnets formed of a hard magnetic material, the first bias element being arranged to form an abutted junction with the first end region of the magnetoresistive element, and the second bias element being arranged to form an abutted junction with the second end region of the magnetoresistive element.

16. The magnetoresistive read sensor of claim 10 wherein the first and second bias elements are each exchange tabs formed of an antiferromagnetic material, the first bias element being exchange coupled to the first end region of the magnetoresistive element, and the second bias element being exchange coupled to the second end region of the magnetoresistive element.

17. The magnetoresistive read sensor of claim 10 wherein the lead-insulator offset distance is in the range of about 0.05 microns to about 0.2 microns.

18. The magnetoresistive read sensor of claim 10 wherein the lead-insulator offset distance is in the range of about 0.09 microns to about 0.11 microns.

19. The magnetoresistive read sensor of claim 10 and comprising a lead-overlay distance equal to the sum of the lead-insulator distance and one of the guide-overlay distances, wherein the lead-overlay distance is greater than about 0.1 microns.

20. A magnetoresistive read sensor comprising:
- a magnetoresistive element having a first and a second end region separated by a center region;
- a first bias element positioned on the first end region of the magnetoresistive element wherein the first bias element is a permanent magnet formed of a hard magnetic material, the first bias element being arranged to form an abutted junction with the first end region of the magnetoresistive element;
- a second bias element positioned on the second end region of the magnetoresistive element wherein the second bias element is a permanent magnet formed of a hard magnetic material, the second bias element being arranged to form an abutted junction with the second end region of the magnetoresistive element;
- a first current guide positioned on the first bias element, and extending a guide-overlay distance onto the center region of the magnetoresistive element wherein the first current guide is formed of an insulating material;
- a second current guide positioned on the second bias element, and extending a guide-overlay distance onto the center region of the magnetoresistive element wherein the second current guide is formed of an insulating material; and
- a first overlaid lead positioned on the first current guide and a second overlaid lead positioned on the second current guide, wherein each of the first and second overlaid leads extends a lead-insulator offset distance onto the center region of the magnetoresistive element, and wherein the first and second overlaid leads are separated by a lead-separation distance.

21. The magnetoresistive read sensor of claim 20 wherein the lead-separation distance is less than about 0.3 microns.

22. The magnetoresistive read sensor of claim 20 wherein the insulating material is selected from the group consisting of oxides and nitrides.

23. The magnetoresistive read sensor of claim 20 wherein the insulating material is aluminum-oxide.

24. The magnetoresistive read sensor of claim 20 wherein the first and second current guides each have a thickness in the range of about 50 Å to about 100 Å.

25. The magnetoresistive read sensor of claim 20 wherein the lead-insulator offset distance is in the range of about 0.05 microns to about 0.2 microns.

26. The magnetoresistive read sensor of claim 20 wherein the lead-insulator offset distance is in the range of about 0.09 microns to about 0.11 microns.

27. The magnetoresistive read sensor of claim 20 and comprising a lead-overlay distance equal to the sum of the lead-insulator distance and one of the guide-overlay distances, wherein the lead-overlay distance is greater than about 0.1 microns.

* * * * *